United States Patent
Horade

(10) Patent No.: US 9,770,929 B2
(45) Date of Patent: *Sep. 26, 2017

(54) IMAGE FORMING APPARATUS AND METHOD FOR PERFORMING PREPARATION OPERATIONS PRIOR TO IMAGE DATA RECEIPT

(71) Applicant: BROTHER KOGYO KABUSHIKI KAISHA, Nagoya-shi, Aichi-ken (JP)

(72) Inventor: Kenta Horade, Tokai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,306

(22) Filed: Jan. 28, 2016

(65) Prior Publication Data
US 2016/0224876 A1   Aug. 4, 2016

(30) Foreign Application Priority Data

Jan. 29, 2015   (JP) .................................. 2015-015890

(51) Int. Cl.
*B41J 29/393*   (2006.01)
*G06K 15/00*   (2006.01)
(Continued)

(52) U.S. Cl.
CPC ......... *B41J 29/393* (2013.01); *B41J 13/0018* (2013.01); *B41J 29/38* (2013.01);
(Continued)

(58) Field of Classification Search
None
See application file for complete search history.

(56) References Cited

U.S. PATENT DOCUMENTS 4,770,555 A * 9/1988 Deschamps ............... B65H 3/44
271/9.05
2004/0184081 A1   9/2004 Yamamoto
(Continued)

FOREIGN PATENT DOCUMENTS

EP   1591262 A2   2/2005
JP   2-39967 A    2/1990
(Continued)

OTHER PUBLICATIONS

Machine translation of JP 2002-073300 A. (JP 2002-073300 A was published on Mar. 12, 2002.).*

(Continued)

*Primary Examiner* — Justin Seo
(74) *Attorney, Agent, or Firm* — Merchant & Gould P.C.

(57) ABSTRACT

An image forming apparatus includes a communication interface, an image forming unit, a plurality of sheet feeders, and a motor configured to selectively apply a drive force any of the sheet feeders. A transmission assembly switches transmission to any one of the sheet feeders. A controller receives preceding data from the communication interface, and, in response, controls the transmission assembly to initiate a switch of the transmission of the drive force to a standard sheet feeder among the plurality of the sheet feeders. In response to receipt control data received after the preceding data, the controller controls the image forming unit, motor, and transmission assembly to form an image on the sheet based on an image forming condition included in the control data.

24 Claims, 7 Drawing Sheets

(51) Int. Cl.
  *G06K 15/16* (2006.01)
  *B41J 29/38* (2006.01)
  *B41J 13/00* (2006.01)
  *B41J 2/165* (2006.01)

(52) U.S. Cl.
  CPC ......... *G06K 15/16* (2013.01); *G06K 15/4025* (2013.01); *B41J 2/16508* (2013.01); *B41J 2/16538* (2013.01); *B41J 2/16547* (2013.01)

(56) References Cited

U.S. PATENT DOCUMENTS

| | | |
|---|---|---|
| 2008/0094444 A1 | 4/2008 | Sakurai |
| 2009/0060555 A1 | 3/2009 | Okada et al. |
| 2011/0310423 A1 | 12/2011 | Motosugi |
| 2012/0146282 A1 | 6/2012 | Chiba |
| 2012/0200872 A1 | 8/2012 | Ito |
| 2014/0021677 A1 | 1/2014 | Nunokawa |
| 2016/0219179 A1 | 7/2016 | Matsui |
| 2017/0087895 A1 | 3/2017 | Arai |

FOREIGN PATENT DOCUMENTS

| | | |
|---|---|---|
| JP | 10-235970 A | 9/1998 |
| JP | 2000-163225 A | 6/2000 |
| JP | 2000-218894 A | 8/2000 |
| JP | 2002-73300 A | 3/2002 |
| JP | 2004-237505 A | 8/2004 |
| JP | 2005-238710 A | 9/2005 |
| JP | 2005-313440 | 11/2005 |
| JP | 2008-105209 A | 5/2008 |
| JP | 2010-117792 A | 5/2010 |

OTHER PUBLICATIONS

Office Action from related U.S. Appl. No. 15/007,798, mailed Aug. 12, 2016.
Related U.S. Appl. No. 15/007,798, filed Jan. 27, 2016.
U.S. Appl. No. 15/277,608, filed Sep. 27, 2016.
Final Office Action issued in related U.S. Appl. No. 15/007,798, dated May 19, 2017.

\* cited by examiner

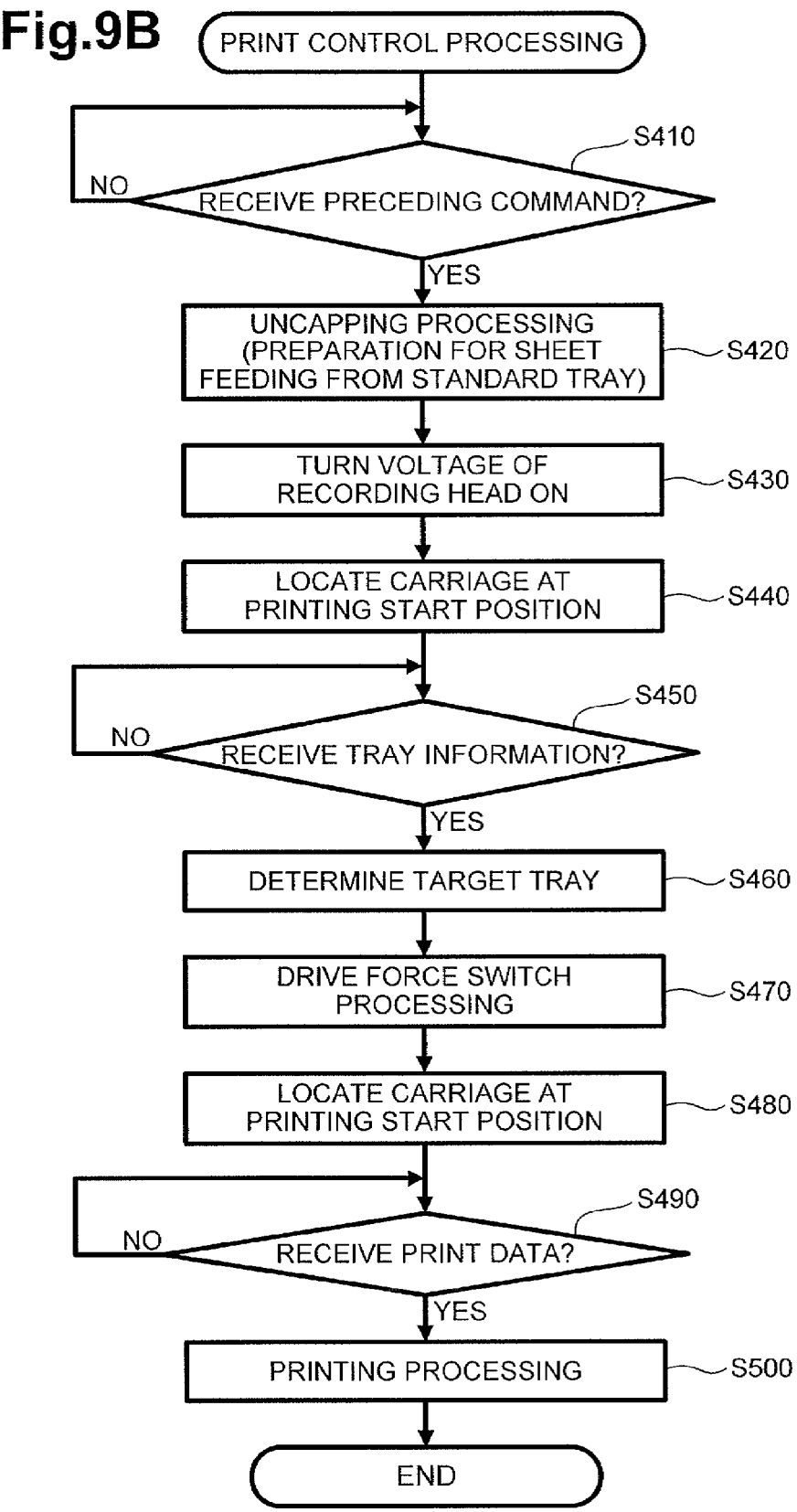

IMAGE FORMING APPARATUS AND METHOD FOR PERFORMING PREPARATION OPERATIONS PRIOR TO IMAGE DATA RECEIPT

CROSS-REFERENCE TO RELATED APPLICATION

This application claims priority from Japanese Patent Application No. 2015-015890 filed on Jan. 29, 2015, the content of which is incorporated herein by reference in its entirety.

FIELD OF DISCLOSURE

The disclosure relates to an image forming apparatus and a method for controlling the image forming apparatus to perform preparation operations prior to image data receipt.

BACKGROUND

A known image forming apparatus is configured to form an image on a sheet based on image data transmitted from a personal computer. In a known system including a personal computer and an image forming apparatus, the personal computer transmits a preparation command, before transmitting image data, to the image forming apparatus for a preparation operation in the image forming apparatus. In response to receiving the preparation command, the image forming apparatus of the system executes a plurality of preparation operations relating to image formation, e.g., cleaning a recording head and uncapping the recording head.

In the known system, in response to receiving the preparation command, the image forming apparatus does not start some preparation operation among a plurality of preparation operations, until the image forming apparatus receives the image data from the personal computer. However, the preparation operation needs to be performed to allow the image forming apparatus to form an image.

SUMMARY

In general, an image forming apparatus is provided in which additional preparation operations may be performed before image data is received from a personal computer. In some cases, in response to receipt of initial data (before image data is received), the image forming apparatus can initiate a switch of transmission of drive force to a standard sheet feeder prior to receipt of image data or control data.

In a first example aspect, an image forming apparatus includes a communication interface; an image forming unit including a recording head; a plurality of sheet feeders; a motor configured to selectively apply a drive force to any one of the plurality of sheet feeders; and a transmission assembly configured to switch transmission of the drive force selectively to any one of the plurality of sheet feeders, by switching a connection between the motor and the plurality of sheet feeders. The image forming apparatus also includes a controller configured to receive preceding data from the communication interface. The controller is also configured to, in response to receipt of the preceding data, control the transmission assembly to initiate a switch of the transmission of the drive force to a standard sheet feeder among the plurality of sheet feeders. The controller is further configured to, in response to receipt of control data received after the preceding data from the communication interface, control the image forming unit, the motor, and the transmission assembly to form an image on the sheet based on an image forming condition included in the control data.

In a second example aspect, a method for controlling operation of an image forming apparatus is disclosed. The method includes receiving preceding data from a communication interface at a controller of the image forming apparatus. The method also includes, in response to receipt of the preceding data, controlling a transmission assembly of the image forming apparatus to initiate a switch of transmission of a drive force of a motor to a standard sheet feeder included among a plurality of sheet feeders, the drive force selectively applicable to each of the plurality of sheet feeders. The method further includes, in response to receipt of control data and after initiating the switch of the transmission of the drive force to the standard sheet feeder, controlling an image forming unit of the image forming apparatus, the motor, and the transmission assembly to form an image on the sheet based on an image forming condition included in the control data.

BRIEF DESCRIPTION OF THE DRAWINGS

FIG. 9B is a flowchart of print control processing.

DETAILED DESCRIPTION

Illustrative embodiments according to one or more aspects of the disclosure are described in detail with reference to the accompanying drawings.

In a known system, it is difficult to increase throughput (e.g., processing speed) of image formation, due to some preparation operation that is not started in response to receiving the preparation command. This disclosure provides a technique by which some preparation operations relating to image formation may be effectively executed when an image forming apparatus according to one or more aspects of the disclosure receives a preparation command.

First Illustrative Embodiment

Figure 1:
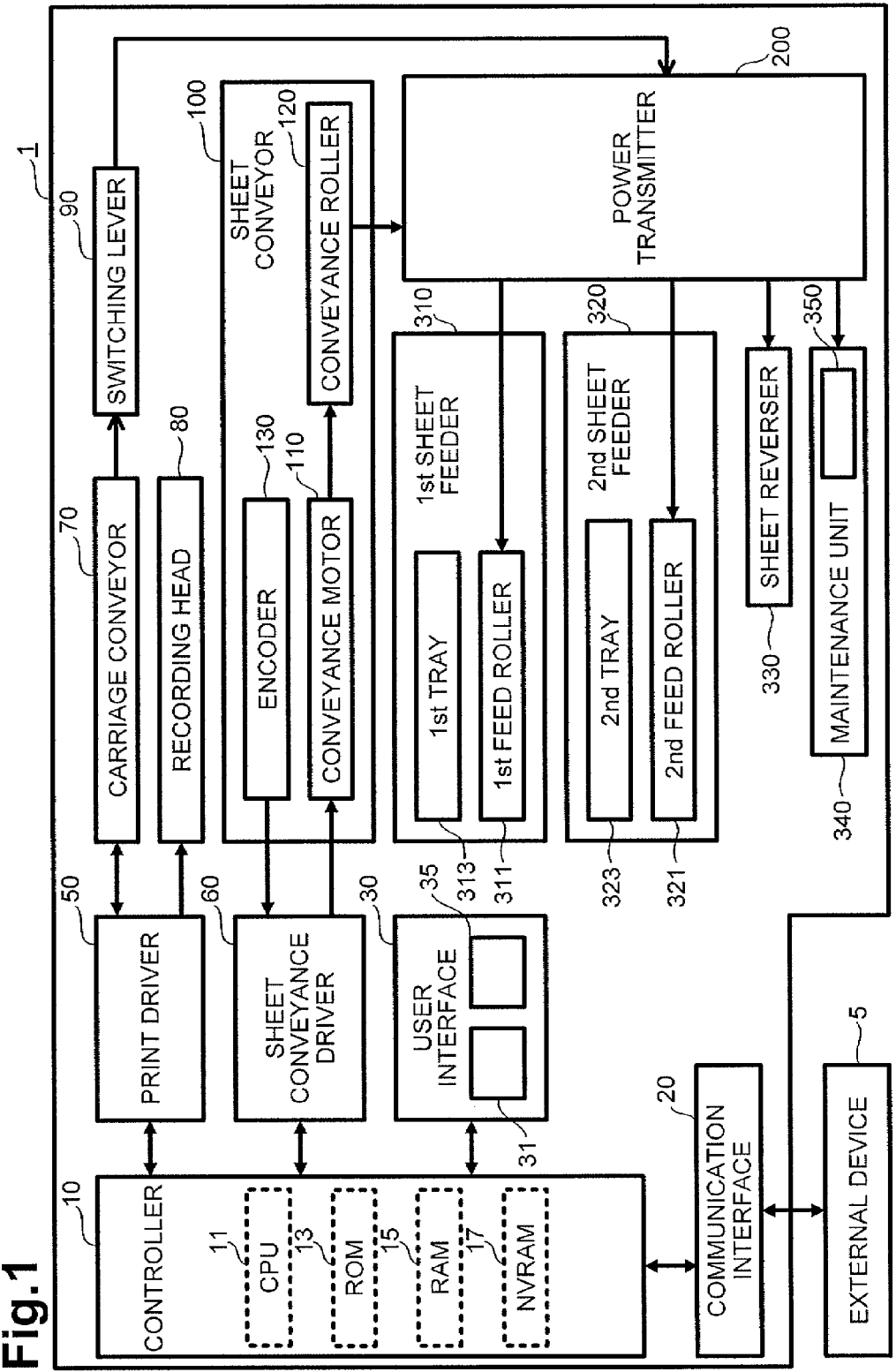
FIG. 1 is a block diagram depicting a general configuration of an image forming apparatus in an illustrative embodiment according to one or more aspects of the disclosure.

An image forming apparatus 1 according to an illustrative embodiment, as depicted in FIG. 1, may be an inkjet printer. The image forming apparatus 1 includes a controller 10, a communication interface 20, a user interface 30, a print driver 50, and a sheet conveyance driver 60.

The image forming apparatus 1 further includes an image forming unit, a transmission assembly, and a plurality of sheet feeders. The image forming unit includes a carriage conveyor 70, a recording head 80. The transmission assembly includes a switching lever 90 and a power transmitter 200. The plurality of sheet feeders includes a first feeder 310 and a second feeder 320. The image forming apparatus 1 also includes a sheet conveyor 100, a sheet reverser 330 and a maintenance unit 340.

The controller 10 includes a central processing unit (CPU) 11, a read-only memory (ROM) 13, a random-access memory (RAM) 15, and a non-volatile random access memory (NVRAM) 17. The ROM 13 stores various programs. The CPU 11 is configured to execute processing based on the programs. The RAM 15 is configured to be used as a work area when the CPU 11 executes processing. The NVRAM 17 is an electrically rewritable nonvolatile memory. The NVRAM 17 is configured to retain necessary data even if power supply of the image forming apparatus 1 is off.

The CPU 11 is configured to control components of the image forming apparatus 1, by performing processing based on computing instructions included in programs stored in the ROM 13, so that various functions may be realized. Hereinafter, processing executed by the controller 10, e.g., the CPU 11, will be described.

The communication interface 20 is configured to perform data communication with an external device 5. An example of the external device is a personal computer. The communication interface 20 is configured to perform, for example, USB communication or Bluetooth® (trademark) communication with the external device 5. The communication interface 20 may be configured to perform wired or wireless LAN communication with the external device 5. The communication interface 20 includes a data receiver and a data transmitter.

The user interface 30 includes a display 31 configured to display information for users, and an operation panel 35. The display 31 includes, for example, a liquid crystal display. The operation panel 35 includes, for example, a touch panel.

The print driver 50 is configured to control the conveyance of a carriage 71 (refer to FIG. 2) on which the recording head 80 is mounted, based on a command from the controller 10. Further, the print driver 50 is configured to control the recording head 80 to eject ink droplets. The print driver 50 is configured to control the carriage conveyor 70 to move the carriage 71 in a main scanning direction. The main scanning direction is perpendicular to a sub scanning direction in which a sheet Q is transported.

Figure 2:
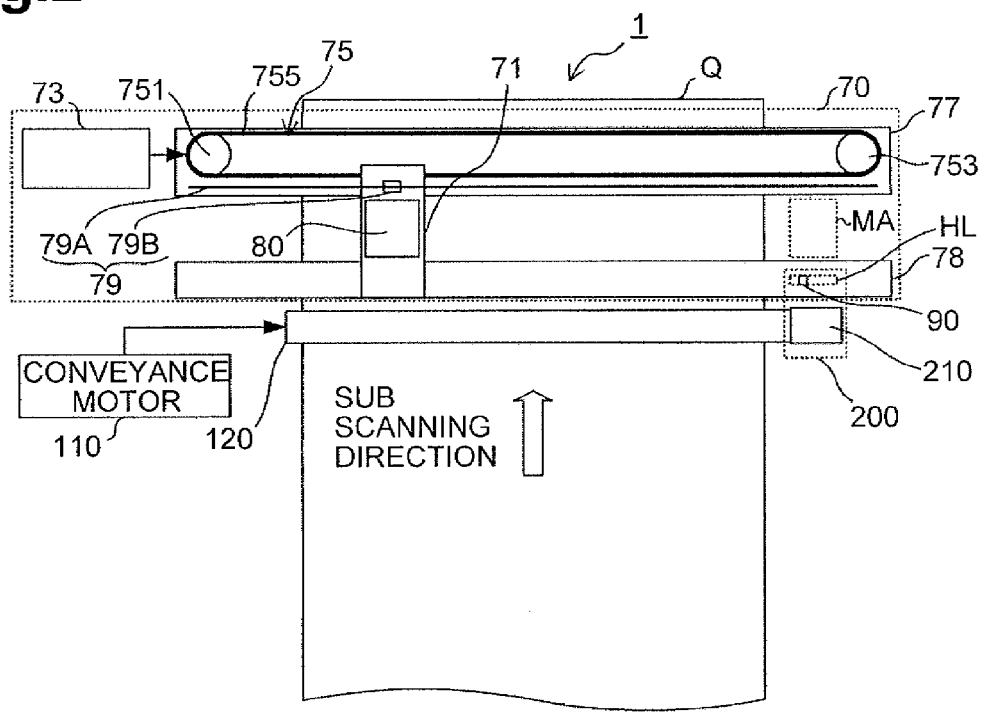
FIG. 2 is a top view depicting a general structure of a transport path of a carriage and its surrounding components.

As depicted in FIG. 2, the carriage conveyor 70 includes the carriage 71, a carriage motor 73, a belt mechanism 75, guide rails 77 and 78, and a linear encoder 79. The carriage motor 73 is controlled by the print driver 50.

The belt mechanism 75 includes a drive pulley 751 and a follower pulley 753, and a belt 755. The drive pulley 751 and the follower pulley 753 are arranged in the main scanning direction. The belt 755 extends around and between the drive pulley 751 and the follower pulley 753. The carriage 71 is fixed to the belt 755. In the belt mechanism 75, the drive pulley 751 is rotated in response to receiving drive force from the carriage motor 73. The belt 755 and the follower pulley 753 are rotated in association with the rotation of the drive pulley 751.

The guide rails 77 and 78 extend along the main scanning direction, and are separated from each other in the sub scanning direction. The guide rail 78 has an opening HL formed thereon. A switching lever 90 protrudes upward (e.g., to a transport path of the carriage 71) from a position below the guide rail 78 through the opening HL. The switching lever 90 will be described in detail, referring to FIG. 4.

The belt mechanism 75 is disposed at the guide rail 77. The guide rails 77 and 78 include elongated protrusions (not depicted) extending, for example, in the main scanning direction. The elongated protrusions are provided to regulate the movement direction of the carriage 71 to the main scanning direction. The carriage 71 is disposed on the guide rails 77 and 78, for example, such that the elongated protrusions engage respective grooves formed on a lower surface of the carriage 71. In this state, the carriage 71 reciprocates in the main scanning direction on the guide rails 77 and 78 in response to the rotation of the belt 755. The recording head 80 is configured to be moved in the main scanning direction in association with the conveyance of the carriage 71.

The linear encoder 79 is configured such that the print driver 50 detects the position of the carriage 71 in the main scanning direction. In one example, the linear encoder 79 includes an encoder scale 79A and an optical sensor 79B. The encoder scale 79A is fixedly disposed at the guide rail 77. The optical sensor 79B is fixedly disposed at the carriage 71. The linear encoder 79 of the optical sensor 79B transmits an encoder signal to the print driver 50 in response to occurring changes in the relative position between the encoder scale 79A and the optical sensor 79B.

The print driver 50 is configured to detect the position of the carriage 71 in the main scanning direction, based on the encoder signal from the linear encoder 79. The print driver 50 is configured to control the position of the carriage 71 in the main scanning direction and the speed of the carriage 71 by controlling the carriage motor 73 based on the detected position of the carriage 71. Further, the print driver 50 is configured to control the recording head 80 to eject ink droplets in association with the conveyance of the carriage 71, to have ink droplets land at intended positions on a sheet Q for proper image formation on the sheet Q.

The sheet conveyance driver 60 (refer to FIG. 1) is configured to control a conveyance motor 110 based on a command from the controller 10. The sheet conveyor 100 includes the conveyance motor 110, a conveyance roller 120 and a rotary encoder 130. The conveyance motor 110 is coupled to the conveyance roller 120, and is configured to rotate the transport roller 120.

The conveyance roller 120 is disposed upstream of an ink droplet ejection position where the recording head 80 ejects ink droplets, in a conveyance direction of a sheet Q. The conveyance roller 120 includes a rotation shaft parallel to the main scanning direction. The conveyance roller 120 is configured to convey a sheet Q fed from an upstream side in the conveyance direction, toward the ink droplet ejection position in the sub scanning direction. A pinch roller (not depicted) is disposed facing the transport roller 120. The sheet conveyor 100 is configured to convey a sheet Q, by rotating the conveyance roller 120 while holding the sheet Q between the conveyance roller 120 and the pinch roller.

The rotary encoder 130 is configured such that the sheet conveyance driver 60 detects a rotation amount and rotation speed of the conveyance roller 120. For example, the rotary encoder 130 is configured to output an encoder signal corresponding to a rotation of the conveyance roller 120. The rotary encoder 130 is disposed at, for example, in a drive force transmission path between the conveyance motor 110 and the conveyance roller 120.

The sheet conveyance driver 60 is configured to detect a rotation amount and a rotation speed of the conveyance roller 120. And the sheet conveyance driver 60 is configured to controls the conveyance motor 110 based on the encoder signal input from the rotary encoder 130. With such configuration, the sheet conveyance driver 60 controls the rotation of the conveyance roller 120, e.g., conveyance of a sheet Q.

The power transmitter 200 is disposed at an end portion of the conveyance roller 120 opposite to its end portion to which the conveyance motor 110 is connected. The power transmitter 200 is configured to receive drive force from the conveyance motor 110 via the conveyance roller 120 and transmit the drive force to any one of the mechanical devices 310, 320, 330, and 340 to be driven. In one example, the power transmitter 200 is configured to transmit the drive force from the conveyance motor 110 selectively to any one of the first sheet feeder 310, the second sheet feeder 320, the sheet reverser 330, and the maintenance unit 340 as the mechanical devices, according to the positions of the switching lever 90.

The first sheet feeder 310 includes a first feed roller 311 and a first tray 313. The first feed roller 311 is configured to rotate in response to receiving the drive force transmitted from the conveyance motor 110 via the conveyance roller 120 and the power transmitter 200. The first sheet feeder 310 is configured to feed a sheet Q accommodated in the first tray 313 to the conveyance roller 120 with the rotation of the first feed roller 311.

The second sheet feeder 320 includes a second feed roller 321 and a second tray 323, similar to the first sheet feeder 310. The second feed roller 321 is configured to rotate in response to receiving the drive force transmitted from the conveyance motor 110 via the conveyance roller 120 and the power transmitter 200. The second sheet feeder 320 is configured to feed a sheet Q accommodated in the second tray 323 to the conveyance roller 120 with the rotation of the second feed roller 321.

The sheet reverser 330 is configured to be driven when duplex printing is performed on a sheet Q. The sheet reverser 330 is configured to operate in response to receiving the drive force transmitted from the conveyance motor 110 via the conveyance roller 120 and the power transmitter 200. The sheet reverser 330 is configured to return a sheet Q, which has passed a printing position (e.g., an ink droplet ejecting position) of the recording head 80 toward a downstream side in a conveyance direction of the sheet Q, to a position upstream of the printing position in the conveyance direction, with the sheet Q turned upside down.

The maintenance unit 340 is configured to perform maintenance for the recording head 80. With maintenance performed by the maintenance unit 340, liquid ejection performance of the recording head 80 may be favorably maintained, so that an image may be properly formed on the sheet Q. The maintenance unit 340 includes a capping mechanism 350 and a pump (not depicted). The pump is configured to operate in response to receiving the drive force from the conveyance motor 110, via the power transmitter 200.

The capping mechanism 350 is disposed at a maintenance area MA (refer to FIG. 2) in the conveyance path of the carriage 71. The maintenance area MA is located at an end portion of the conveyance path of the carriage 71. A central portion of the conveyance path of the carriage 71 is a main area in the conveyance path where the recording head 80 reciprocates for image formation on a sheet Q. The maintenance area MA is disposed adjacent to the main area.

Figure 3:
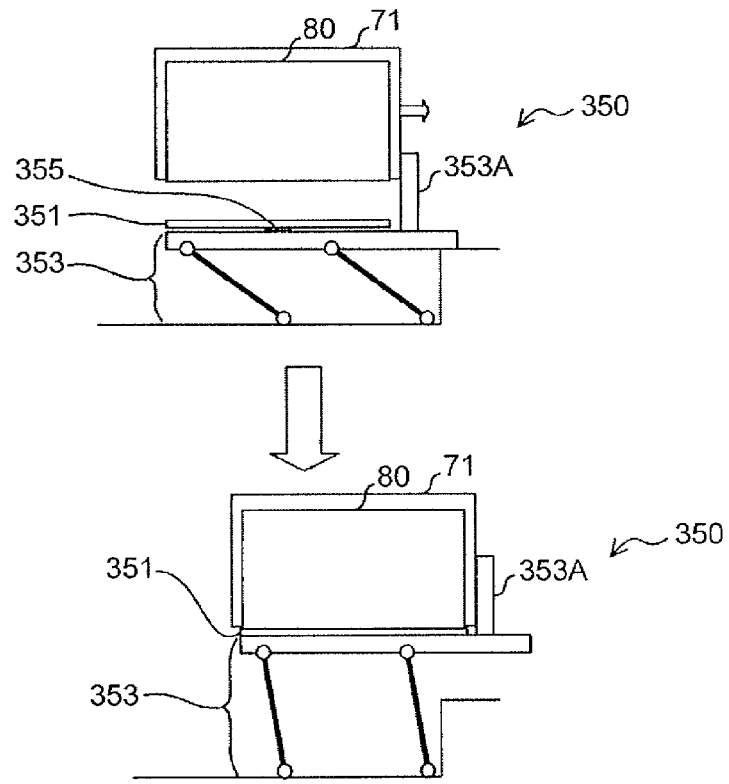
FIG. 3 is a side view depicting a general structure of a capping mechanism.

As depicted in FIG. 3, the capping mechanism 350 includes a cap 351 configured to cover a nozzle surface of the recording head 80 where nozzles configured to eject ink droplets are arranged, and an elevator 353. The cap 351 is connected to the elevator 353 via a spring 355. The top diagram in FIG. 3 schematically depicts arrangements of the cap 351 and the elevator 353 before the cap 351 covers the recording head 80. The bottom diagram in FIG. 3 schematically depicts arrangements of the cap 351 and the elevator 353 when the cap 351 covers the recording head 80.

The elevator 353 includes a wall 353A configured to contact the carriage 71. The elevator 353 is configured to operate in response to receiving force from the carriage 71. In one example, the elevator 353 is configured to receive force applied from the carriage 71 via the wall 353A when the carriage 71 enters the maintenance area MA from the main area and moves toward an end of the conveyance path (e.g., the right end in FIG. 2). In response to receiving the force applied from the carriage 71 via the wall 353A, the elevator 353 gradually moves the cap 351 upwardly to cause the cap 351 to cover the nozzle surface of the recording head 80. Covering by the cap 351 completes as the carriage 71 has moved to the end of the conveyance path.

When the carriage 71 moves from the end of the conveyance path toward the main area, the elevator 353 is released from the force applied from the carriage 71. Accordingly, the elevator 353 operates due to its own weight to move the cap 351 down. As the cap 351 is moved down, the cap 351 is removed or separated from the recording head 80 and the nozzle surface of the recording head 80 is exposed.

The capping mechanism 350 is configured to mechanically operate in response to receiving the force from the carriage 71, so that the cap 351 covers or is separated from the recording head 80. The pump is configured to operate, in response to receiving the drive force from the conveyance motor 110, when the cap 351 covers the nozzle surface of the recording head 80. The pump is configured to suck ink droplets from the recording head 80 via the cap 351.

Next, the power transmitter 200 will be described in detail. The power transmitter 200, as depicted in FIG. 4B, includes a drive gear 210, a movable gear 220, connection gears 230A, 230B, 230C, and 230D corresponding to the mechanical devices 310, 320, 330, and 340, respectively. Each of the drive gear 210, the movable gear 220, and the connection gears 230A-D is a spur gear. The connection gears 230A-D may represent the connection gears 230A, 230B, 230C, and 230D. The connection gear 230 may represent any one of the connection gears 230A, 230B, 230C, and 230D.

The drive gear 210 is fixed at an end portion of the conveyance roller 120 such that a rotation axis thereof matches a rotation axis of the conveyance roller 120. With such structure, the drive gear 210 and the conveyance roller 120 rotate together. The drive gear 210 has such a dimension in an axial direction thereof that allows the movable gear 220 to always engage the drive gear 210 in a movable range of the movable gear 220.

The movable gear 220 is disposed such that the movable gear 220 constantly engages the drive gear 210 and a rotation axis of the movable gear 220 is parallel to the rotation axis of the drive gear 210. A guide shaft 225 is disposed along the rotation axis of the movable gear 220, through an opening located at the rotation axis of the movable gear 220. With such structure, the movable gear 220 is rotatable relative to the guide shaft 225 and to slidably move in the axial direction thereof.

The movable gear 220 is also movable between the connection gears 230A-D while being guided by the guide shaft 225. The connection gears 230A-D are arranged in a row relative to the rotation axis of the movable gear 220 (e.g., the shaft member 225), such that vertical side surfaces of the respective connection gears 230A-D, which are perpendicular to an axis of a rotational shaft 235, face with each other. The movable gear 220 has such a dimension in an axial direction thereof that allows each of the connection gears 230A-D to individually engage the movable gear 220.

The guide shaft 225 supports the switching lever 90 to allow a supported portion 90E of the switching lever 90 to slidably move. The supported portion 90E is disposed adjacent to the movable gear 220 at a position closer to the end of the conveyance path of the carriage 71 than the movable gear 220.

Two springs 227 and 228 are disposed at the guide shaft 225, sandwiching the movable gear 220 and the supported portion 90E of the switching lever 90 therebetween. An urging force of the spring 228 is greater than an urging force of the spring 227. Therefore, the switching lever 90 receives, in its entire movable range, an urging force in a direction from the connection gear 230D to the connection gear 230A. The movable gear 220 receives an urging force from the spring 227. Therefore, when the switching lever 90 moves in a direction from the connection gear 230A toward the connection gear 230D, the movable gear 220 moves following the switching lever 90. The movable gear 220 is configured to move according to the position of the switching lever 90 with application of the force from the spring 227.

Figure 4A:
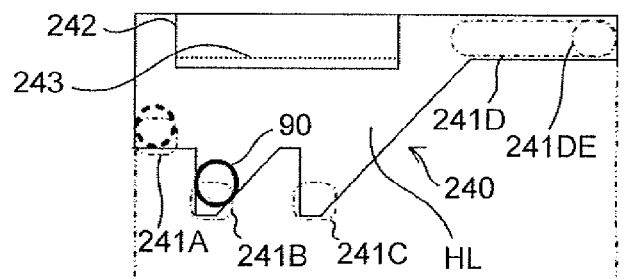
FIG. 4A is a schematic top view depicting a structure of a lever holder.
Figure 4B:
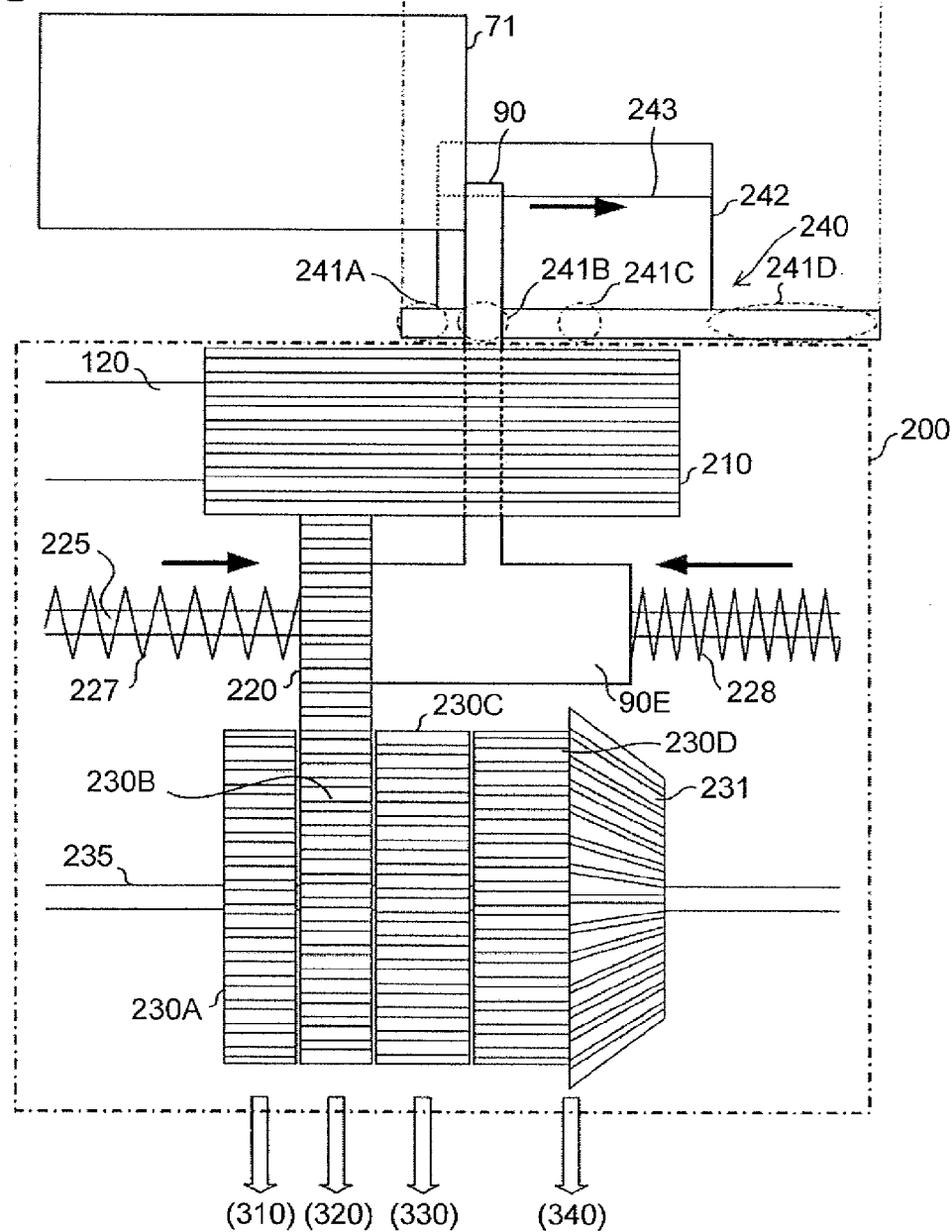
FIG. 4B is a schematic side view depicting a structure of a power transmitter.

The switching lever 90 is disposed in a lever holder 240 having the opening HL, as depicted in FIG. 4A. FIG. 2 schematically depicts the opening HL in a rectangular shape. FIG. 4A depicts a shape of the opening HL in more detail. FIG. 4A depicts the shape of the opening HL viewed from a top surface of the guide rail 78. The lever holder 240 is fixed at an opening formed in the guide rail 78.

The lever holder 240 includes lever location areas 241A, 241B, 241C, and 241D. As the switching lever 90 contacts an edge of the opening HL in the lever location area 241A, the switching lever 90 is held so as not to move toward the main area in the conveyance path of the carriage 71 even with application of forces of the springs 227 and 228. When the switching lever 90 is in the lever location area 241A, the movable gear 220 is located at a position where the movable gear 220 engages the connection gear 230A.

When the carriage 71 enters the maintenance area MA from the main area, the switching lever 90 contacts the carriage 71 and moves from the lever location area 241A toward the lever location area 241D, while receiving pressing force from the carriage 71. When the carriage 71 moves toward the main area in the conveyance path, the switching lever 90 is released from the pressing force of the carriage 71 and moves from the lever location area 241D to the lever location area 241A with application of the force from the spring 228.

When the switching lever 90 is in the lever location area 241B with the supported portion 90E of the switching lever 90 contacting the movable gear 220, the movable gear 220 is located at a position where the movable gear 220 engages the connection gear 230B. Similarly, when the switching lever 90 is in the lever location area 241C or 241D, the movable gear 220 is located at a position where the movable gear 220 engages the connection gears 230C or 230D, respectively.

The switching lever 90 receives application of force of the spring 228 due to its winding or twisting (e.g., force along a circumferential direction of the guide shaft 225) at the supported portion 90E. For example, the switching lever 90 receives application of force directing leftward and downward in FIG. 4A.

Therefore, while the switching lever 90 moves from the lever location area 241A toward the lever location area 241D, the switching lever 90 moves along a lower edge of the opening HL in FIG. 4A. Even when the carriage 71 retracts toward the main area during the movement of the switching lever 90, the switching lever 90 is held in the lever location area 241B or 241C by cutouts formed in the respective lever location areas 241B and 241C.

As the carriage 71 starts to retract after the switching lever 90 is located in the lever location area 241D, the switching lever 90 returns to the lever location area 241A, while being guided by lever guide 242, with application of the force from the spring 228. The lever guide 242 includes a rail 243 extending downward. The switching lever 90 returns to the lever location area 241A while contacting the rail 243. At this time, the movable gear 220 moves toward the connection gear 230A together with the switching lever 90 with application of force via the supported portion 90E of the switching lever 90.

The connection gears 230A-D are rotatably supported by the common rotational shaft 235, which is parallel to the guide shaft 225. Each of the connection gears 230A-D is disposed within the movable range of the movable gear 220.

The connection gear 230A is connected to the first sheet feeder 310. For example, when the connection gear 230A is engaged with the movable gear 220, the connection gear 230A receives drive force from the conveyance roller 120, via the drive gear 210 and the movable gear 220. And the connection gear 230A transmits the drive force to the first sheet feeder 310. Accordingly, the first sheet feeder 310 is driven.

The connection gear 230B is connected to the second sheet feeder 320. For example, when the connection gear 230B is engaged with the movable gear 220, the connection gear 230B receives the drive force from the conveyance roller 120, via the drive gear 210 and the movable gear 220. And the connection gear 230B transmits the drive force to the second sheet feeder 320. Accordingly, the second sheet feeder 320 is driven.

The connection gear 230C is connected to the sheet reverser 330. For example, when the connection gear 230C is engaged with the movable gear 220, the connection gear 230C receives the drive force from the conveyance roller 120, via the drive gear 210 and the movable gear 220. And the connection gear 230C transmits the drive force to the sheet reverser 330. Accordingly, the sheet reverser 330 is driven.

The connection gear 230D includes a bevel gear portion 231. The connection gear 230D is connected to the maintenance unit 340 by the bevel gear portion 231. When the connection gear 230D is engaged with the movable gear 220, the connection gear 230 D receives the drive force from the conveyance roller 120, via the drive gear 210 and the movable gear 220. And the connection gear 230D transmits the drive force to the maintenance unit 340. Accordingly, the maintenance unit 340 (e.g., the pump) is driven.

When the switching lever 90 moves toward the end of the conveyance path of the carriage 71 in the lever location area 241D, the movable gear 220 is urged by the spring 227, but prevented from moving toward the end of the conveyance path by the bevel gear portion 231 of the connection gear 230D. Accordingly, the connection of the movable gear 220 with the connection gear 230D is maintained.

When the switching lever 90 moves to the end of the conveyance path in the lever location area 241D, the capping mechanism 350 lifts the cap 351 up in association with the movement of the carriage 71. When the switching lever 90 moves to a dead end 241DE of the lever location area 241D, capping of the recording head 80 is completed.

The end of the conveyance path of the carriage 71 where capping of the recording head 80 completes corresponds to a home position of the carriage 71. The carriage 71 is kept at the home position when printing on a sheet Q is not required. At this time, the switching lever 90 is maintained at the dead end 241DE of the lever location area 241D and the drive force transmission path between the conveyance motor 110, and the first sheet feeder 310, the second sheet feeder 320, and the sheet reverser 330, is maintained interrupted.

When the carriage 71 enters the main area from the home position, the switching lever 90 located at the lever location area 241D returns to the lever location area 241A while being guided by the lever guide 242. When the supported portion 90E of the switching lever 90 contacts the movable gear 220, the movable gear 220 moves from a position where the movable gear 220 engages the connection gear 230D to a position where the movable gear 220 engages the connection gear 230A, in response to the movement of the switching lever 90. The lever location area 241A is a first area where the switching lever 90 is positioned when the switching lever 90 returns from the lever location area 241D.

When print data is transmitted from the external device 5, the controller 10 controls various components of the image forming apparatus 1 to form an image based on the print data, on a sheet Q. In one example, the controller 10 is configured to control a conveyance operation of the carriage 71, an ejecting operation of ink droplets from the recording head 80, positions of the switching lever 90, a feeding operation by one of the sheet feeder 310 and 320, and a transport operation of a sheet Q by the sheet conveyor 100. These operations and controlling positions of the switching lever 90 are performed by inputting some commands to the print driver 50 and the sheet conveyance driver 60. The controls of the controller 10 will be described in detail later.

Figure 5:
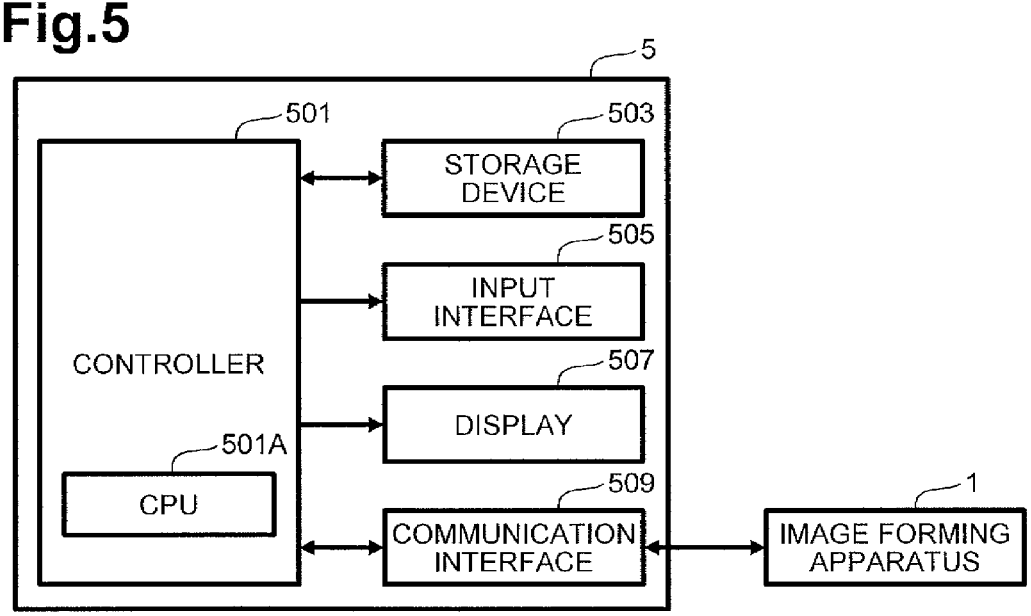
FIG. 5 is a block diagram depicting a general configuration of an external device.

The external device 5 is configured as depicted in FIG. 5. The external device 5 includes a controller 501, a storage device 503, an input interface 505, a display 507, and a communication interface 509. The controller 501 of external device 5 includes a central processing unit (CPU) 501A configured to execute processing in accordance with various programs. The controller 501 is configured to control components of the external device 5. In the following description, processing executed by the controller 501, e.g., the CPU 501A, will be described.

The storage device 503 of the external device 5 stores various programs included computing instructions to be executed by the CPU 501A. The storage device 503 includes, for example, a hard disk device readable by the CPU 501A. The storage device 503 stores an application program, e.g., word-processing software, and a printer driver, as the above-described various programs.

The input interface 505 of the external device 5 is configured to input a signal of an operation by a user, to the controller 501. The input interface 505 includes, for example, a keyboard and a pointing device. The display 507 is configured to display information for users under the control of the controller 501. The display 507 includes, for example, a liquid crystal display.

The communication interface 509 of the external device 5 is configured to perform data communication with the image forming apparatus 1. The communication interface 509 is configured to transmit print data to the image forming apparatus 1 for example, under the control of the controller 501.

Figure 6:
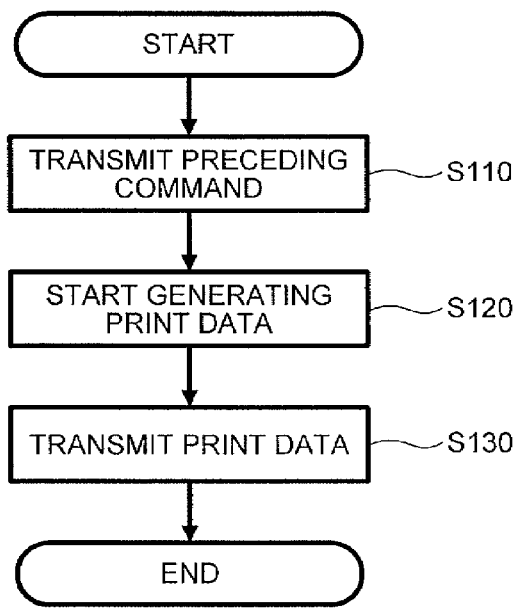
FIG. 6 is a flowchart of processing to be executed by a controller of the external device.

Next, processing executed by the controller 501 of the external device 5 based on the printer driver stored in the storage device 503 will be described referring to FIG. 6. The controller 501 is configured to execute the processing as depicted in FIG. 6, in response to a print instruction input by a user via an application program.

In response to being input a print instruction, the controller 501 transmits a preceding command to the image forming apparatus 1 that is designated by a user as a printing output destination (S110). A preceding command is data for notifying that print data will be transmitted and data for ordering or requesting a print preparation.

Thereafter, the controller 501 converts target print data designated by the user into print data for printing in print conditions designated by the user on a sheet Q (S120). The print data includes, for example, data of a target print image described in page-description language, and data for controlling a printing operation in the image forming apparatus 1. The print data includes, at a beginning thereof, print conditions, e.g., a size and a type of a sheet Q to be used.

Thereafter, the controller 501 sequentially transmits pieces of the converted print data to the image forming apparatus 1 (S130). A piece of print data is generated, for example, as a unit of data of an image to be formed on a sheet Q by one-way movement or a traverse of the carriage 71 in the main scanning direction (hereinafter referred as "data for one pass" or "data in a unit of one pass"). Pieces of print data are sequentially transmitted.

The controller 10 of the image forming apparatus 1 sequentially receives the preceding command and the print data, via the data communication interface 20, from the external device 5 that transmits the preceding command and the print data.

Figure 7:
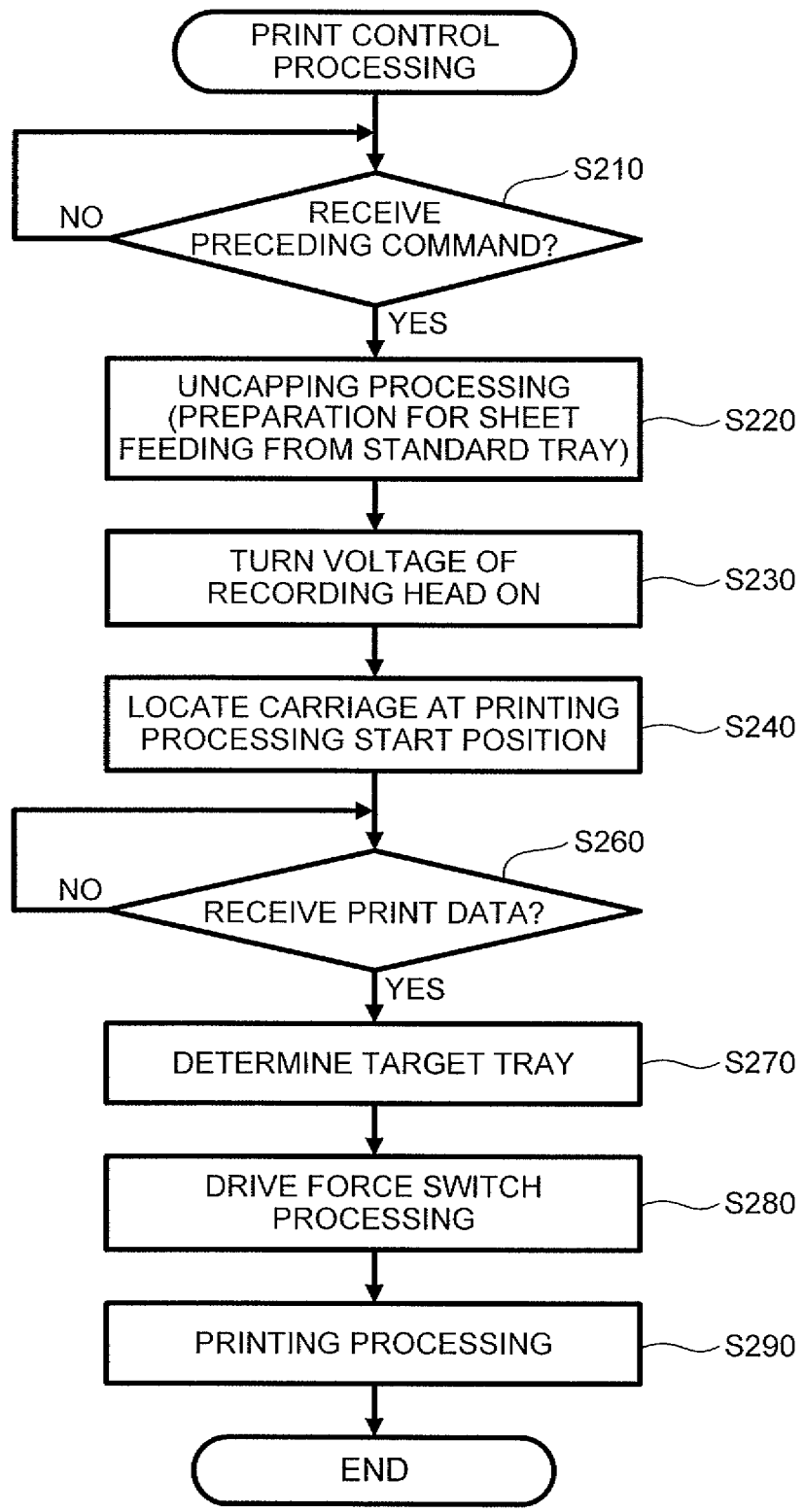
FIG. 7 is a flowchart of print control processing to be executed by a controller of the image forming apparatus.

Next, print control processing executed by the controller 10 of the image forming apparatus 1 will be described referring to FIG. 7. The controller 10 is configured to execute print control processing depicted in FIG. 7.

In the print control processing, in response to that the controller 10 receives a preceding command from the external device 5 (S210: Yes), the controller 10 executes S220 and its subsequent steps.

In S220, the controller 10 executes uncapping processing. The uncapping processing is processing in which the controller 10 controls the carriage 71 via the carriage conveyor 70, to separate the cap 351 from the recording head 80. In the uncapping processing, the controller 10 controls the carriage 71 to move from the end of the maintenance area MA (e.g., the home position) toward the main area. Thus, the switching lever 90 moves from the lever location area 241D to the lever location area 241A.

In the following description, the lever location area 241A, the lever location area 241B, the lever location area 241C, and the lever location area 241D may be represented as the position A, the position B, the position C, and the position D, respectively. The switching lever 90 is configured to move between the position A, the position B, the position C and the position D in a predetermined cyclical order, e.g., from the position A, the position B, the position C, the position D, and then to the position A.

While the carriage 71 is moved toward the main area with the switching lever 90 in the position D (e.g., the dead end 241DE), the switching lever 90 moves or is able to move to the position A, while being guided by the lever guide 242, without engaging cutouts of the lever holder 240 provided at the position B and the position C. In response to the movement of the switching lever 90, the movable gear 220 also moves or is able to move to a position where the movable gear 220 engages the connection gear 230A. When the switching lever 90 moves from the position D (e.g., the dead end 241DE) to the position A, the elevator 353 is operated to move the cap 351 down, so that the cap 351 is separated from the recording head 80.

Additionally, in the uncapping processing, while the carriage 71 passes the position A and moves toward the main area, the controller 10 controls operation of the movable gear 220 via the drive gear 210, to slightly rotate alternately in forward and reverse directions, to engage the movable gear 220 with the connection gear 230A. The slight rotation is realized by controlling the rotation of the conveyance motor 110 via the sheet conveyance driver 60. Repetitive slight rotations may cause a timing in which a tooth of the movable gear 220 engages with a tooth space in the connection gear 230A in a rotating direction of the movable gear 220. The repetitive slight rotations may cause that the movable gear 220 may slidably move to the connection gear 230A. An operation to slightly rotate the drive gear 210 and the movable gear 220 in the forward and reverse directions is hereinafter referred to as a forward-reverse operation.

To move the movable gear 220 to a position where the movable gear 220 engages with an intended connection gear 230, the controller 10 performs positional control for the switching lever 90 and the forward-reverse operation. The forward-reverse operation may not necessarily be performed in a system in which gears mesh with each other without the forward-reverse operation.

With the execution of the uncapping processing in S220, the controller 10 completes drive preparation for the first sheet feeder 310 (e.g., sheet feed preparation). Further, the controller 10 performs drive preparation for the recording head 80 by turning drive voltage of the recording head 80 on, concurrently with the uncapping processing (S230).

Further, the controller 10 performs conveyance control for the carriage 71 such that the carriage 71 is located at a printing processing start position in the main area and the controller 10 prepares for a prompt printing operation after starting to receive the print data (S240). The printing processing start position is located upstream of an ink droplet ejection start position in a conveyance direction of the carriage 71 by a distance necessary for accelerating the speed of the carriage 71 to a target speed.

Thereafter, the controller 10 waits for print data for the first one pass to be received (S260). In response to receiving the data, the controller 10 determines a target tray based on the print conditions included in the print data for the first one pass (S270).

A sheet feed tray of the sheet feeder 310 or 320 to be driven is hereinafter referred to as a "target tray." For example, the target tray corresponds to the sheet feeder 310 or 320 to be driven. The print data includes setting data of a size and a type of a sheet Q to be used and a sheet feed tray to be used, as print condition information.

The setting data of the sheet feed tray represents any one of "automatically select," "the first tray" and "the second tray". When the setting data of the sheet feed tray represents "automatically select", the controller 10 determines a target tray based on a size and a type of a sheet Q to be used. Information of a type and a size of sheets Q accommodated in the each of the first tray 313 and the second tray 323 is input in advance by a user via the operation panel 35, and the information is stored in the NVRAM 17. The controller 10 determines a target tray based on information stored in the NVRAM 17.

Based on that the setting data of the sheet feed tray represents "the first tray" or "the second tray", the controller 10 determines "the first tray" or "the second tray" corresponding to the setting data, as a target tray.

Figure 8:
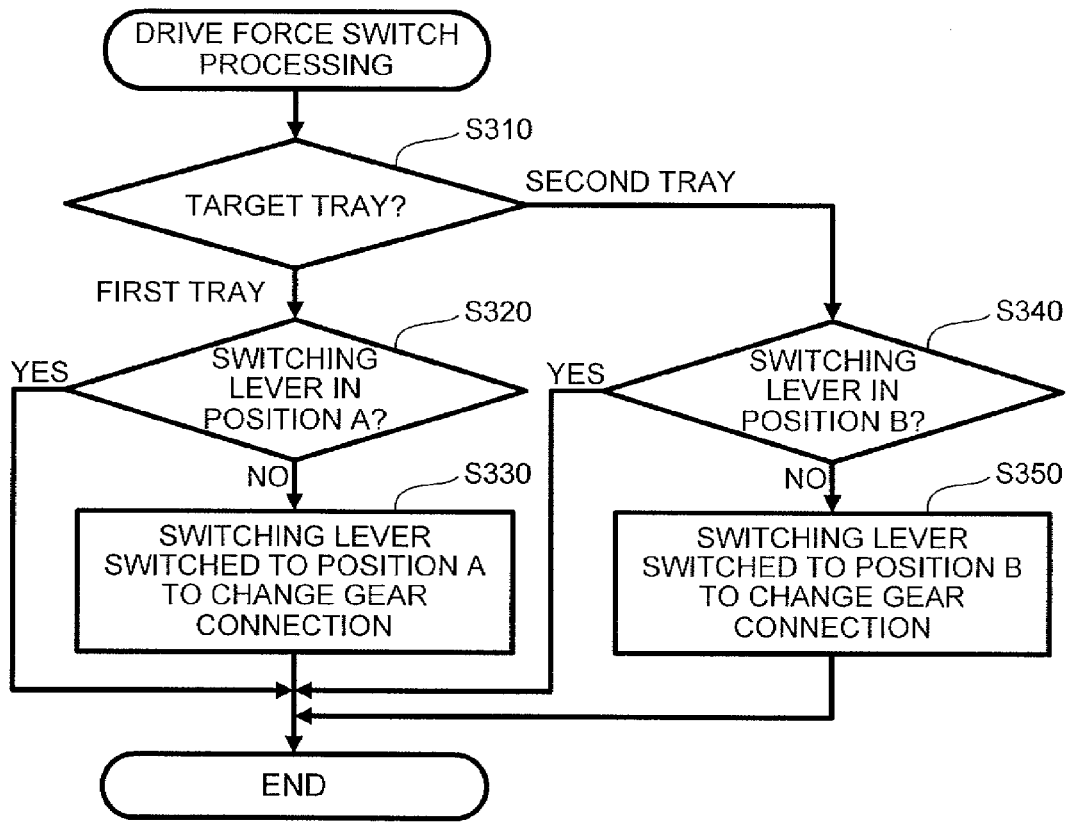
FIG. 8 is a flowchart of drive force switch processing to be executed by the controller of the image forming apparatus.

Thereafter, the controller 10 executes drive force switch processing depicted in FIG. 8 (S280). In the drive force switch processing, the position of the switching lever 90 is changed to a position corresponding to the target tray. Thus, the controller 10 may perform modification processing for the sheet feed preparation performed in S220.

In the drive force switch processing, the controller 10 determines whether the target tray is the first tray 313 or the second tray 323 (S310). Based on determination that the target tray is the first tray 313, the controller 10 determines whether the switching lever 90 is in the position A (S320).

The controller 10 determines wheatear the switching lever 90 is in the position A, based on previous positional control of the carriage 71. In one example, the controller 10 may made the above determination by storing the position of the switching lever 90 every time the switching lever 90 is moved with the control of the carriage 71.

Based on that the switching lever 90 is in the position A (S320: Yes), the controller 10 ends the drive force switch processing. Based on that the switching lever 90 is not in the position A (S320: No), the controller 10 performs conveyance control for the carriage 71 such that the switching lever 90 is switched to the position A. The controller 10 further performs the forward-reverse operation, to connect the movable gear 220 to the connection gear 230A (S330). Thereafter, the controller 10 ends the drive force switch processing.

Additionally, to move the switching lever 90 to the position A from the position B or the position C, the controller 10 performs conveyance control for the carriage 71 such that the switching lever 90 is moved to the position D. Thereafter, the controller 10 controls the carriage 71 to move to a position corresponding to the position A.

Based on determination that the target tray is the second tray 323, the controller 10 determines whether the switching lever 90 is in the position B (S340). Based on that the switching lever 90 is in the position B (S340: Yes), the controller 10 ends the drive force switch processing.

Based on that the switching lever 90 is not in the position B (S340: No), the controller 10 performs conveyance control for the carriage 71 such that the switching lever 90 is switched to the position B. The controller 10 further performs the forward-reverse operation, to connect the movable gear 220 to the connection gear 230B (S350). Thereafter, the controller 10 ends the drive force switch processing.

With the execution of the drive force switch processing, the controller 10 switches connection between the sheet feeders 310 and 320 and the conveyance motor 110 such that a sheet Q is fed toward the conveyance roller 120 from the sheet feed tray that meets the print conditions represented in the print data.

Thereafter, the controller 10 executes printing processing (S290). In the print processing, the controller 10 sequentially receives pieces of print data that are transmitted in a unit of one pass and inputs commands to the print driver 50 and the sheet conveyance driver 60 such that a target print image based on the print data is printed on the sheet Q.

With the sheet conveyance driver 60 operated according to an input command, the first sheet feeder 310 or the second sheet feeder 320 is driven by the conveyance motor 110 to feed a sheet Q toward the conveyance roller 120. The conveyance roller 120 rotates to convey the sheet Q fed from an upstream side in the sub scanning direction, to a downstream side in the sub scanning direction.

With the print driver 50 operated according to an input command, the carriage 71 reciprocates after located at the printing processing start position, and the recording head 80 ejects ink droplets at such timings to form the target print image on the sheet Q. In sync with the reciprocating movement of the carriage 71, the conveyance roller 120 conveys the sheet Q downstream in the sub scanning direction by a predetermined amount every time the carriage 71 moves for one pass.

With a series of such operations, an image based on the print data from the external device 5 is printed on the sheet Q similar to a known inkjet printer.

Structures of the image forming apparatus 1 are described above. The external device 5 transmits a preceding command (S110), in response to a print instruction input from a user. Thereafter, the external device 5 transmits print data including print conditions, to the image forming apparatus 1 (S130).

The controller 10 of the image forming apparatus 1 sequentially receives the preceding command and the print data from the information processor 5, via the communication interface 20 (S210 and S260). Then, in response to receiving the preceding command, the controller 10 controls the movement of the carriage 71 to move the switching lever 90, and to separate the cap 351 from the recording head 80. Thereafter, the controller 10 performs the forward-reverse operation (S220), to mesh the movable gear 220 with the connection gear 230A, so that transmission of the drive force of the conveyance motor 110 is changed to the first sheet feeder 310. Accordingly, the first sheet feeder 310 including the first tray 313 may be placed to be driven by the conveyance motor 110 as a standard tray, from a disconnected state in which the conveyance motor 110 is disconnected from the sheet feeders 310 and 320.

The power transmitter 200 switches transmission of the drive force from the conveyance motor 110 to any one of the sheet feeders 310 and 320, according to the positions of the switching lever 90, by switching connection between the conveyance motor 110, and the sheet feeders 310 and 320.

Based on that a sheet feed tray specified in the print conditions represented in the print data is different from the standard tray (e.g., the first tray 313), the controller 10 performs the drive force switch processing (S280). The print data is output from the external device 5. In the drive force switch processing (S280), the controller 10 switches connection between the sheet feeders 310 and 320, and the conveyance motor 110 such that a sheet feeder that meets the print conditions is driven.

Thereafter, the controller 10 inputs commands to the print driver 50 and the sheet conveyance driver 60 such that an image based on the print data is formed on a sheet Q. The controller 10 controls various components via the print driver 50 and the sheet conveyance driver 60. In one example, the controller 10 controls an operation of the carriage 71 with the carriage conveyor 70, an ink droplet ejection operation of the recording head 80, a sheet feeding operation of the sheet feeders 310 and 320, and a sheet conveyance operation of the sheet conveyor 100, via the print driver 50 and the sheet conveyance driver 60.

In the image forming apparatus 1, the sheet feeder 310 or 320 to be driven is not determined until print data is received. It may be difficult to increase throughput with respect to print processing if drive preparation for the sheet feeders 310 and 320 is put on hold until a drive target is determined. The image forming apparatus 1 is configured to perform drive preparation for a standard sheet feeder 310 among a plurality of the sheet feeders 310 and 320, in response to receiving a preceding command.

If a user is recommended to accommodate the sheets Q having a size and a type that are frequently used in the first tray 313, the possibility is reduced that the time for sheet feed preparation until a drive target is determined will be wasted. It is noted, for example, that the user is recommended to accommodate above sheets in tray though a manual. Therefore, as print processing preparation, drive preparation for a sheet feeder may be efficiently executed and throughput with respect to print processing may be increased.

As above described, the power transmitter 200 is configured to switch transmission of the drive force in a predetermined order, in response to the movement of the switching lever 90. Further, the standard tray is set to the first tray 313 of the first sheet feeder 310 that may be placed to be first driven from the disconnected state.

A case in which the standard tray is set to the second tray 323 of the second sheet feeder 320 is assumed. In this case, the switching lever 90 is located in the position B at the time the controller 10 has received print data. In response to that the controller 10 has received print data and the controller 10 determines that the first sheet feeder 310 is a sheet feeder to be driven, the controller 10 controls the carriage 71 temporarily to move such that the switching lever 90 to the position D from the position B. Thereafter, the controller 10 needs to control the carriage 71 to move the switching lever 90 to the position A. In other words, the carriage 71 needs to be moved twice in this case.

A case in which the standard tray is set to the first tray 313 of the first sheet feeder 310, is assumed. In this case, the switching lever 90 is located at the time the controller 10 has received print data. In response to that the controller 10 has received print data and the controller 10 determines that the second sheet feeder 320 is a sheet feeder to be driven, the controller 10 controls the carriage 71 to move the switching lever 90 to the position B from the position A. For example, as compared with the above case (e.g., when the standard tray is set to the second tray 323), the movement of the carriage 71 is reduced to once, and an inefficient operation of the carriage 71 may be reduced.

Therefore, as described above, throughput with respect to print processing may be increased in a situation in which the first tray 313 accommodates therein sheets Q having a size and a type that are frequently used. If the second tray 323 accommodates therein sheets Q having a size and a type that are frequently used, an inefficient operation of the carriage 71 may be reduced, as compared with the above case (e.g., when the standard tray is set to the second tray 323). Accordingly, reduction in throughput may be reduced or prevented.

Therefore, as described above, sheet feed preparation based on a preceding command may be performed with a minimum operation of the switching lever 90, from the disconnected state. Accordingly, in a situation in which a sheet feeder 310 or 320 to be driven is not specified, drive preparation for a sheet feeder may be efficiently executed, while the inefficient operation is reduced.

Further, as described above, movement of the carriage 71 may cause the capping mechanism 350 to be operated. And the operation of the capping mechanism 350 may cause the cap 351 to separate from and cover the recording head 80. For example, movement of the carriage 71 may cause the switching lever 90 to move to the position A. At this time, the forward-reverse operation is performed. Thus, an operation of separating the cap 351 from the recording head 80 and drive preparation for the first sheet feeder 310 may be performed at the same time. Therefore, preparation for print processing may be performed efficiently.

Further, after the position of the switching lever 90 is changed, movement preparation for the carriage 71 is performed prior to the print processing by placing the carriage 71 and the recording head 80 in the initial position for print processing (e.g., the printing processing start position) (S240). Therefore throughput with respect to the print processing may further be increased.

Second Illustrative Embodiment

Figure 9A:
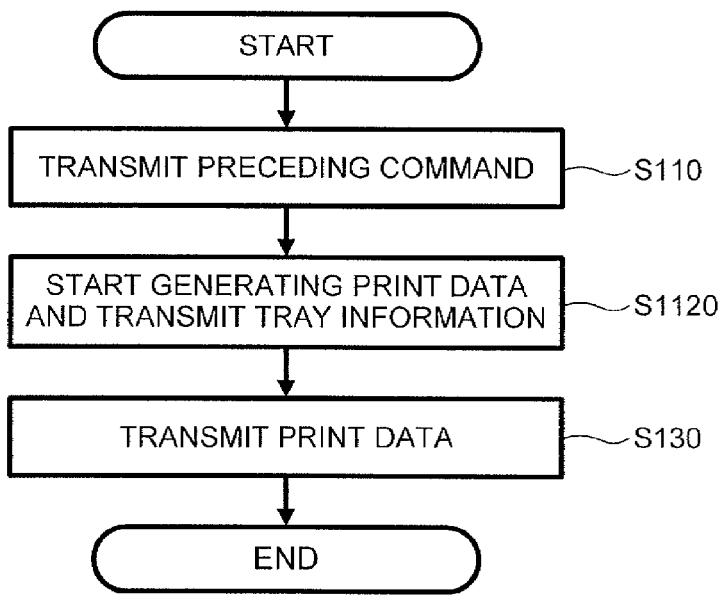
FIG. 9A is a flowchart of processing to be executed by the controller of the external device.

Next, a second illustrative embodiment will be described. In the second illustrative embodiment, the controller 501 of the external device 5 is configured to execute processing as depicted in FIG. 9A, instead of the processing, as depicted in FIG. 6, performed by the controller 501 of the external device 5 in the first illustrative embodiment. Further, in the second illustrative embodiment, the controller 10 of the image forming apparatus 1 is configured to execute print control processing as depicted in FIG. 9B, instead of the print control processing, as depicted in FIG. 7, performed by the controller 10 of the image forming apparatus 1 in the first illustrative embodiment. The print control processing according to the second illustrative embodiment will be described below.

As the controller 10 starts the print control processing depicted in FIG. 9B, the controller 10 waits for a preceding command from the external device 5 (S410). In response to receiving the preceding command, the controller 10 executes step S420 and its subsequent steps.

In S420, the controller 10 executes the uncapping processing similar to S220. At this time, the controller 10 controls the movement of the carriage 71 to separate the cap 351 from the recording head 80, and to change a connection state of the power transmitter 200 so that the first sheet feeder 310 and the conveyance motor 110 are connected to each other. Thus, drive preparation is performed for the first sheet feeder 310 including the first tray 313 as a standard tray.

The controller 10 performs drive preparation for the recording head 80 concurrently with the uncapping processing, by turning the drive voltage of the recording head 80 on (S430). Further, the controller 10 performs movement preparation for the carriage 71 before printing is started, by locating the carriage 71 at the printing processing start position (S440).

Thereafter, the controller 10 waits for tray information from the external device 5 (S450). Unlike the first illustrative embodiment, the external device 5 according to the second illustrative embodiment is configured to transmit, in S1120 (in FIG. 9A), the tray information specifying a sheet feed tray (e.g., a target tray) to be used in printing processing before print data is transmitted. The tray information includes setting data of a size and a type of a sheet, and a sheet feed tray.

In response to receiving the tray information (S450: Yes), the controller 10 determines the target tray based on the tray information, similar to S270 (S460). Thereafter, the controller 10 executes the drive force switch processing depicted in FIG. 8 (S470). Thus, the controller 10 may perform modification processing for the sheet feed preparation performed in S420. With the drive force switch processing, positions of the switching lever 90 and the movable gear 220 are changed to positions corresponding to the sheet feed tray specified by the tray information.

As the drive force switch processing ends, the controller 10 controls the carriage 71 to move at the printing processing start position, similar to S440 (S480). Thereafter, the controller 10 waits for print data from the external device 5 (S490). As the controller 10 starts to receive the print data, the controller 10 executes printing processing based on the print data, similar to S290 (S500).

As described above, the print data may or may not necessarily include setting data of a size and a type of a sheet and a sheet feed tray. That is, in control data for the image forming apparatus 1, the tray information, as control data for the sheet feed tray, is transmitted prior to control data for a target print image (e.g., print data). Therefore, sheet feed preparation may be performed more efficiently according to the illustrative embodiment.

Other Illustrative Embodiments

The image forming apparatus 1 according to the first and the second illustrative embodiments is described above. However, the disclosure is not limited to the above-described embodiments. Various changes, arrangements and modifications may be applied without departing from the spirit and scope of the disclosure. For example, the disclosure may be applied to an image forming apparatus including three sheet feed trays or more. For example, the image forming apparatus 1 may include a third sheet feeder including a third tray, instead of the sheet reverser 330.

The elevator 353 is configured to move the cap 351 up and down by contacting and separating the carriage 71 relative to a contact member (e.g., the wall 353A). The disclosure is not limited thereto. For example, a motor may be added. The motor may be driven to move the cap 351 and the elevator 353 up and down. In such structure, the controller 10 may drive the motor to operate the elevator 353 such that the cap 351 is moved up, in response to determining that the carriage 71 is in the home position, via the carriage conveyor 70. In the uncapping processing, the controller 10 may drive the motor to operate the elevator 353 such that the cap 351 is moved down.

The controller 501 of the external device 5 may be configured to transmit a preceding command at a time other than that described above. For example, a preceding command may be transmitted at a time when a user operates, via the input interface 505, a print menu in an application program, or a print condition change menu for changing print conditions in the print menu.

The initial setting of the standard tray may be set to the first tray 313. The image forming apparatus 1 may be configured to change the initial setting of the standard tray by an instruction from a user. In the image forming apparatus 1, after the initial setting of the standard tray is changed to the second tray 323, the controller 10 may control the carriage 71 to move the switching lever 90 to the position B, in the uncapping processing in S220 or S420. While the disclosure has been described with reference to illustrative embodiments, it is to be understood that the disclosure is not limited to the illustrative embodiments. While the various elements of the illustrative embodiments are shown in various combinations and configurations, which are illustrative, other combinations and configurations, including more, less or only a single element, are also within the spirit and scope of the disclosure.

What is claimed is:

1. An image forming apparatus, comprising:
    a communication interface;
    an image forming unit including a recording head;
    a plurality of sheet feeders;
    a motor configured to selectively apply a drive force to any one of the plurality of sheet feeders;
    a transmission assembly configured to switch transmission of the drive force selectively to any one of the plurality of sheet feeders, by switching a connection between the motor and the plurality of sheet feeders; and
    a controller configured to:
        receive preceding data from the communication interface, the preceding data notifying the image forming apparatus that control data will subsequently be received, the preceding data not specifying which of the plurality of sheet feeders is to be used in response to subsequent receipt of control data;
        in response to receipt of the preceding data and prior to receipt of control data, control the transmission assembly to initiate a switch of the transmission of the drive force to a standard sheet feeder among the plurality of sheet feeders; and
        in response to receipt of control data received after the preceding data from the communication interface, control the image forming unit, the motor, and the transmission assembly to form an image on the sheet based on an image forming condition included in the control data.

2. The image forming apparatus according to claim 1, wherein the controller is further configured to,
    determine whether an image forming condition implicating use of another of plurality of sheet feeders is different from the standard sheet feeder, the image forming condition included in the control data;
    based on determination that the another of the plurality of sheet feeders is different from the standard sheet feeder, control the transmission assembly to initiate a switch of the transmission of the drive force to the another of plurality of sheet feeders among the plurality of sheet feeders after initiating the switch of the transmission of the drive force to the standard sheet feeder.

3. The image forming apparatus according to claim 1, wherein the controller is configured to control the transmission assembly to initiate a switch of the transmission of the drive force to the standard sheet feeder from a disconnected position in which all of the plurality of the sheet feeders are disconnected from the motor.

4. The image forming apparatus according to claim 3, wherein the transmission assembly is movable through a plurality of drive positions and the disconnected position, the disconnected position corresponding to a position in which all of the plurality of the sheet feeders are disconnected from the motor.

5. The image forming apparatus according to claim 4,
    wherein the controller is configured to control the transmission assembly to switch the transmission of the drive force sequentially among the plurality of sheet feeders and the disconnected position, and
    wherein the controller is configured to control the transmission assembly to switch the transmission of the drive force to the standard sheet feeder sequentially following the disconnected position.

6. The image forming apparatus according to claim 5, wherein the controller is configured to control the transmission assembly to switch the transmission of the drive force from the standard sheet feeder through one or more others of the plurality of sheet feeders to reach the disconnected position.

7. The image forming apparatus according to claim 5, further comprising a maintenance unit, and wherein, in the disconnected position, the controller is configured to direct the maintenance unit to execute a maintenance operation for the recording head.

8. The image forming apparatus according to claim 1, wherein movement of the recording head applies a force to a portion of the transmission assembly to switch transmission of the drive force selectively to any one of the plurality of sheet feeders.

9. The image forming apparatus according to claim 8, wherein the controller is configured to control the transmission assembly to switch the transmission of the drive force to the standard sheet feeder at least in part by moving the recording head to an initial image forming position.

10. The image forming apparatus according to claim 9,
    wherein the controller is configured to control the image forming unit to cause the recording head to move across the sheet and to eject ink during the movement across the sheet to form the image on the sheet, and
    wherein the controller is configured to initiate to move the recording head from the initial image forming position at the initiation of image forming.

11. The image forming apparatus according to claim 1, wherein the controller is configured to control the transmission assembly to initiate a switch of the transmission of the drive force to the standard sheet feeder prior to receipt of the control data from the communication interface.

12. The image forming apparatus according to claim 1, wherein the controller is configured to, in response to receipt of the preceding data, control the transmission assembly to switch transmission of the drive force to the standard sheet feeder prior to receipt of the control data from the communication interface.

13. The image forming apparatus according to claim 1, wherein the transmission assembly comprises a power transmitter including:
    a connection gear configured to transmit the drive force to the standard sheet feeder; and
    another connection gear configured to transmit the drive force to another of the plurality of sheet feeders different from the standard sheet feeder.

14. The image forming apparatus according to claim 13, wherein the transmission assembly further comprises a switching lever.

15. The image forming apparatus according to claim 14,
    wherein the transmission assembly further comprises a movable gear movable between a position in which the movable gear transmits the drive force to the connection gear and another position in which the movable gear transmits the drive force to the another connection gear, and
    wherein the switching lever is configured to move the movable gear to either the positions.

16. The image forming apparatus according to claim 14, wherein the transmission assembly is configured to switch transmission of the drive force of the motor to any of the plurality of sheet feeders based on a position of the switching lever.

17. The image forming apparatus according to claim 16, wherein the switching lever is moved any positions by the movement of the recording head.

18. The image forming apparatus according to claim 1, wherein the transmission assembly is configured that, during transmission of the drive force to the standard sheet feeder, the drive force is disengaged from another of the plurality of sheet feeders.

19. The image forming apparatus according to claim 1, wherein each of the plurality of sheet feeders includes a tray.

20. The image forming apparatus according to claim 1, wherein the standard sheet feeder is a sheet feeder selected by a user.

21. The image forming apparatus according to claim 1, wherein the standard sheet feeder is a sheet feeder identified in initial settings of the image forming apparatus.

22. The image forming apparatus according to claim 1, further comprising a capping mechanism including a cap, the capping mechanism configured to removably cover the recording head with the cap;

wherein controlling the transmission assembly to switch the transmission of the drive force to the standard sheet feeder includes removing the cap from the recording head.

23. The image forming apparatus according to claim 22, wherein the controller controls movement of the recording head to apply a force to remove the cap from the recording head.

24. A method of controlling an image forming apparatus, the method comprising:

receiving preceding data from a communication interface at a controller of the image forming apparatus, the preceding data notifying the image forming apparatus that control data will subsequently be received, the preceding data not specifying which of the plurality of sheet feeders is to be used in response to subsequent receipt of control data;

in response to receipt of the preceding data and prior to receipt of control data, controlling a transmission assembly of the image forming apparatus to initiate a switch of transmission of a drive force of a motor to a standard sheet feeder included among a plurality of sheet feeders, the drive force selectively applicable to each of the plurality of sheet feeders; and in response to receipt of control data and after initiating the switch of the transmission of the drive force to the standard sheet feeder, controlling an image forming unit of the image forming apparatus, the motor, and the transmission assembly to form an image on the sheet based on an image forming condition included in the control data.

* * * * *